United States Patent [19]
Winberg

[11] 3,756,571
[45] Sept. 4, 1973

[54] MIXING CAPSULE IN PARTICULAR FOR DENTAL PREPARATION
[76] Inventor: Raanar O. Winberg, Silvakragatan 87, 252 57 Helsingborg, Sweden
[22] Filed: Oct. 29, 1971
[21] Appl. No.: 193,750

[52] U.S. Cl............ 259/60, 206/47 A, 259/DIG. 20
[51] Int. Cl............................................... B01f 5/00
[58] Field of Search .................. 259/60, 70, 18, 27, 259/DIG. 20; 206/47 A

[56] References Cited
UNITED STATES PATENTS
3,100,045  8/1963  Via ................................. 206/47 A
3,290,017  12/1966 Davies ........................... 206/47 A
3,638,918  2/1972  Denholtz ........................ 206/47 A Primary Examiner—Robert W. Jenkins
Attorney—John J. Dennemeyer

[57] ABSTRACT

A mixing capsule for dental preparations where one of the components to be mixed is stored in an elongated mixing chamber and the other component or components are stored in separate compartments prior to mixing. The capsule comprises means for injecting the contents of the separate compartment or compartments in the mixing chamber to form a self-curing compound. The invention provides sealing means, which upon removal from the mixing capsule provide access to the mixing chamber along substantially the entire length thereof.

6 Claims, 6 Drawing Figures

PATENTED SEP 4 1973  3,756,571

MIXING CAPSULE IN PARTICULAR FOR DENTAL PREPARATION

BACKGROUND OF THE INVENTION

Mixing capsule for dental preparations, such as dental cement of the silicate type, are usually provided with a cylindrical mixing chamber having a length at least twice as great as the diameter, and provided with an opening at only one of its ends. At room temperature the preparation cures rapidly, and the dentist usually has to apply the preparation within 75 seconds or less, after which time the preparation has cured beyond usefulness.

Prior art mixing capsules present a problem in this respect since access to the preparation in the mixing chamber through the opening at the end thereof is rather difficult or inconvenient. The practial disadvantages in this respect are well known to the practising dentist.

SUMMARY OF THE INVENTION

According to the invention the access problem is solved by providing the mixing capsule with removable sealing means along essentially the entire length of the elongated mixing chamber, thus presenting the preparation to the dentist in a rather shallow trough, where it is easily accessable. This and other features of the present invention are more fully explained in the following description of some preferred embodiments, and illustrated in the accompanying drawings.

DESCRIPTION OF A FIRST EMBODIMENT

Figure 1:
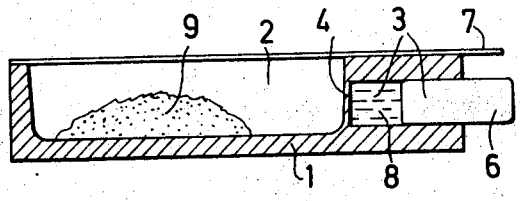
FIG. 1 is a sectional view of a first embodiment of the invention, prior to mixing.
Figure 2:
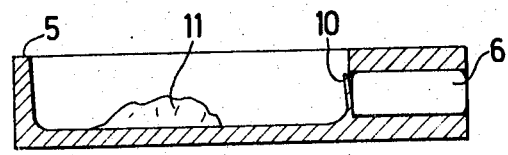
FIG. 2 is a similar sectional view of the first embodiment after mixing has taken place.
Figure 3:
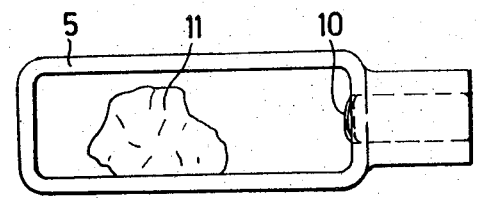
FIG. 3 is a view of the embodiment according to FIG. 2 seen from the top.

FIGS. 1 – 3 show a mixing capsule 1 intergrally made from plastics. The capsule is provided with an elongated mixing chamber 2 having considerably greater length than width and/or depth. In the capsule 1 there is also provided a smaller, cylindrical compartment 3, separated from the mixing chamber 2 by a thin, impervious wall 4, the upper periphery of which is weakened to present a local rupture line. The mixing chamber 2 has upper, plan and continuous edge portions 5 covered by a removable foil sheet 7, protruding somewhat outside said edge portion to assist removal. In the cylindrical compartment 3 is a slidable plunger 6, and the space between the head surface of the plunger 6 and the wall 4 contains a liquid 8, said liquid being one of the components of the preparation. The mixing chamber 2 contains the second component 9, in this case a powder. Provided that the two substances are separated from each other, as in FIG. 1, they may be stored for a considerable time.

When the preparation is needed, the plunger 6 is depressed, the pressure causing the wall 4 to rupture at its upper periphery and form a flap 10 so that the liquid may be injected in the mixing chamber. The flap 10 then returns essentially to its initial position, and will thus present an obstacle in the mixing process. The capsule is then immediately placed in a suitable apparatus (not shown) where it is subjected to rapid reciprocating movement in the longitudinal direction, for approximately ten seconds. The foil 7 may then be removed and the mixed preparation is easily accessible.

DESCRIPTION OF A SECOND EMBODIMENT

Figure 4:
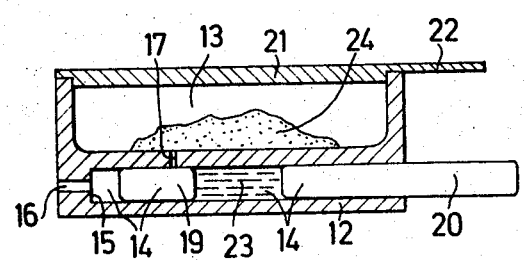
FIG. 4 is a sectional view of a second embodiment of the present invention prior to mixing.
Figure 5:
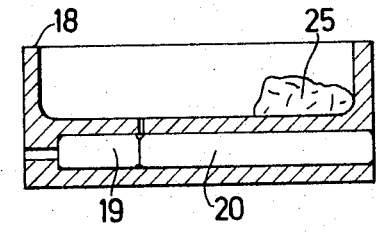
FIG. 5 is a similar sectional view of the second embodiment after mixing has taken place.
Figure 6:
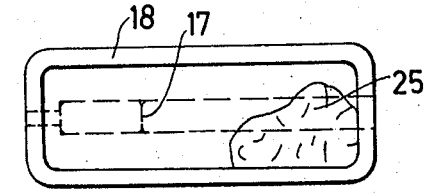
FIG. 6 is a view of the embodiment according to FIG. 5 seen from the top.

FIGS. 4 – 6 show a second embodiment comprising a mixing capsule 12 integrally made from plastics. The capsule 12 is provided with an elongated mixing chamber 13, situated above an elongated space 14 of circular cross section, the inner end 15 of which is provided with a small channel or bore 16 to the outside. A narrow, radial channel 17 connects the mixing chamber 13 and the compartment 14. The mixing chamber 13 has a plane, continuous upper edge portion 18 cooperating in sealing relationship with a cover or lid 21 provided with a tounge 22 in order to be easily removable.

In the cylindrical compartment 14 there is an inner, short plunger 19, and a longer outer plunger 20, and between facing ends of the plungers there is a liquid 23 being one of the components to be mixed. The other component is a powder 24 in the mixing chamber itself, and as long as the components are kept separated from one another, as shown in FIG. 4, they may be stored for a considerable time.

When the preparation is needed the plunger 20 is depressed, which via the liquid 23 also causes the plunger 19 to move to the left in the drawing until it abuts on the end surface 15. The plunger 19 thus no longer covers the entrance to channel 17, and the continued depression of the plunger 20 causes the liquid 23 to be injected in the mixing chamber 13. The capsule is the subjected to a rapid reciprocating movement, as mentioned in the description of the first embodiment, and the preparation 25 will then be easily accessable simply by the removal of the cover or lid 21.

POSSIBLE MODIFICATIONS OF THE FIRST EMBODIMENT

The embodiment of the invention described with reference to FIGS. 1 – 3 may of cause be adapted to a three-component application if a second compartment, similar to compartment 3, and a second plunger, similar to plunger 6, are located in the opposite end wall of the mixing chamber. The compartments, of course, do not have to be of equal volume.

POSSIBLE MODIFICATIONS OF THE SECOND EMBODIMENT

The embodiment of the invention described with reference to FIGS. 4 – 6 may be adapted to a three- or multi-component application by providing one or more additional cylindrical compartments similar to the compartment 14, in a parallel relationship under the mixing chamber, each of which is provided with similar plungers, channels etc.

METHOD OF FILLING THE CAPSULES

The capsule according to FIGS. 1 – 3 may have the liquid filled in its compartment in vacuum, or the plunger 6 may be provided with an axial bore. In the latter case the liquid is first introduced in the compartment, then the plunger is placed in the indicated position, then the bore is closed by e.g. gluing.

The capsule according to FIGS. 4 – 6 may of course also be filled in vacuum, or it may be filled through the channel 17, provided that the plunger 19 initially abuts against the end surface 15. When the liquid has been filled the plunger 19 is depressed until it covers the opening of the channel.

The plungers may be manufactured from metal, glass or plastics. The wall 14 may be replaced with a rupture diaphragm. The capsule itself may be manufactured from any suitable material which is inert with respect to the components, such as metal, glass or plastics. The actual mixing does not have to be affected by a reciprocating movement, but e.g. supersonic vibrations. Of course the use of the mixing capsule is not limited to the mixing of dental preparations.

There have thus been described preferred embodiments of a mixing capsule for two or more separately storable components, reactive with one another upon mixing to form a self curing compound. It will be understood by those skilled in the art that various changes and omissions in the form and detail thereof may be made therein without departing from the spirit and scope of the invention.

What is claimed is:

1. A sealed capsule for the mixing of substances comprising in combination:
    a. a mixing receptacle having at least two separate compartments for containing dissimilar components that are reactive with one another;
    b. at least one of said separate compartments being a mixing compartment;
    c. at least one of said separate compartments having a volume less than that of said mixing compartment;
    d. a wall separating said compartments;
    e. means for expelling substantially all of the contents of said small volume compartment into said mixing compartment without causing a change in volume of said mixing compartment, said small volume compartment being resealed in relation to said mixing compartment after expulsion of the contents therein; and
    f. means for opening said mixing chamber along substantially its entire length after mixing of said reactive components.

2. A sealed capsule as defined in claim 1 wherein said small volume compartment includes a slidably mounted plunger means.

3. A sealed capsule as defined in claim 2 wherein movement of said slidably mounted plunger means in said small volume chamber causes rupture of said wall separating said reactive components expelling substantially all of the contents of said small volume compartment into said mixing compartment.

4. A sealed capsule as defined in claim 1 wherein said plunger includes an inner short slidably mounted plunger means and an outer long slidably mounted plunger.

5. A sealed capsule as defined in claim 4 wherein said wall separating said reactive components includes a channel, said channel being first sealed by said short slidably mounted punger.

6. A sealed capsule as defined in claim 5 wherein movement of said outer long slidably mounted plunger into said small volume compartment causes said inner short slidably mounted plunger to unseal said channel in said wall separating the reactive components expelling substantially all of the contents of said small volume compartment into said mixing compartment.

* * * * *